United States Patent [19]

Palazzotto

[11] Patent Number: 5,089,536

[45] Date of Patent: Feb. 18, 1992

[54] ENERGY POLMERIZABLE COMPOSITIONS CONTAINING ORGANOMETALLIC INITIATORS

[75] Inventor: Michael C. Palazzotto, St. Paul, Minn.

[73] Assignee: Minnesota Mining and Manufacturing Company, St. Paul, Minn.

[21] Appl. No.: 443,660

[22] Filed: Nov. 22, 1982

[51] Int. Cl.$^5$ .................. C08F 2/50; C08F 4/42; C08F 16/32; C08F 16/18; C08F 26/10; C08F 59/24; C08F 59/68; C08F 59/72

[52] U.S. Cl. .................. 522/16; 427/53.1; 427/54.1; 522/17; 522/18; 522/23; 522/26; 522/27; 522/28; 522/29; 522/31; 522/33; 522/38; 522/39; 522/49; 522/52; 522/63; 522/64; 522/65; 522/66; 522/99; 522/166; 522/167; 522/168; 522/169; 522/170; 522/172; 522/173; 522/181; 522/904; 526/115; 526/117; 526/120; 526/131; 526/154; 526/170; 526/171; 526/288; 526/264; 526/332; 526/333; 528/15; 528/92; 528/361; 528/411; 528/412; 556/7; 556/15; 556/16; 556/30

[58] Field of Search .......... 204/159.11; 522/16, 522/17, 18, 23, 26, 27, 28, 29, 31, 33, 38, 39, 49, 52, 63, 64, 65, 66; 526/115, 117, 120, 131, 154, 170, 171; 528/15, 92, 411, 412

[56] References Cited

U.S. PATENT DOCUMENTS

| | | | |
|---|---|---|---|
| 3,551,153 | 12/1970 | Cooper et al. | 96/86 |
| 3,705,129 | 12/1972 | Murio et al. | 260/47 |
| 3,709,861 | 1/1973 | Anderson | 204/159.11 |
| 3,714,006 | 1/1973 | Anderson | 204/159.14 |
| 3,794,576 | 2/1974 | Watt | 204/159.11 |
| 3,867,354 | 2/1975 | Betts et al. | 260/78.4 |
| 3,933,777 | 1/1976 | Babitsky et al. | 526/137 |
| 4,026,705 | 5/1977 | Crivello et al. | 96/27 |
| 4,058,400 | 11/1977 | Crivello | 96/86 |
| 4,080,274 | 3/1978 | Schlesinger | 204/159.18 |
| 4,086,091 | 4/1978 | Cella | 96/36.2 |
| 4,216,288 | 8/1980 | Crivello | 204/159.18 |
| 4,237,242 | 12/1980 | Frankel | 525/119 |
| 4,446,246 | 5/1984 | McGinniss | 528/87 |

OTHER PUBLICATIONS

Helling et al., "New, Improved Synthesis of Bisbenzeneiron (II) . . ."; Journal of the Chemical Society; Chemical Communications 1971, p. 930.

McGiniss "Organometallic Redox" Polymer Preprints 15, No. 2, Sep. 1974, Amer. Chem. Soc., pp. 302-305.

Ledwith "New Initiation Systems" Makromol. Chem. Sup. 3, 348-358 (1979).

Woodhouse, et al., *J. Am. Chem. Soc.* 100, 966 (1978).

Woodhouse, et al., *J. Am. Chem. Soc.* 104, 5586 (1982).

Kaeriyama, et al., *J. Polym. Sci., Chem. Ed.* 10, 2833 (1972).

*Primary Examiner*—Marion E. McCamish
*Assistant Examiner*—Arthur H. Koeckert
*Attorney, Agent, or Firm*—Gary L. Griswold; Walter N. Kirn; Lorraine R. Sherman

[57] ABSTRACT

An energy polymerizable composition and process therefore, comprising a cationically polymerizable material and a catalytically effective amount of an ionic salt of an organometallic complex cation as polymerization initiator, said ionic salt of an organometallic complex cation being capable of adding an intermediate strength nucleophile or upon photolysis capable of liberating at least one coordination site, said metal in said organometallic complex cation being selected from elements of Periodic Groups IVB, VB, VIB, VIIB, and VIIIB are disclosed. Certain of the organometallic polymerization initiators are novel cationic salts.

21 Claims, No Drawings

ENERGY POLMERIZABLE COMPOSITIONS CONTAINING ORGANOMETALLIC INITIATORS

TECHNICAL FIELD

The present invention relates to a process for the polymerization of cationically-sensitive materials employing as polymerization initiator a certain class of ionic organometallic compounds. In another aspect, it relates to polymerizable compositions containing cationically-sensitive materials and organometallic complex compounds. In a further aspect, it relates to certain organometallic polymerization initiators.

BACKGROUND ART

The prior art describes various processes for the initiation of cationic polymerization, particularly the polymerization of epoxy materials. It is known to cure epoxy materials by use of curing additives such as polybasic anhydrides, organic peroxides, and quinone. It is further known that a metallocene, such as ferrocene, can be used as a curing accelerator for epoxy materials and is described in U.S. Pat. No. 3,705,129. U.S. Pat. Nos. 3,709,861 and 3,714,006 describe the use of cyclopentadienylmanganese tricarbonyl for the acceleration of the light-catalyzed reaction between polyepoxides and acid anhydrides or polymercaptans. U.S. Pat. No. 3,867,354 discloses the use of bis- and tris-salicylic acid complexes of chromium(III) to catalyze the reaction between epoxides and carboxylic acids, and U.S. Pat. No. 4,237,242 relates to the use of transition metal complexes (chromium, manganese, iron, etc.) of acetylacetonate type ligands to accelerate the thermally initiated reaction of carboxylic acid group-containing polymers with polyepoxides. Each of the above-mentioned patents teaches the acceleration of the reaction between polyepoxides and polyfunctional curing additives, but they do not teach the polymerization of epoxide group-containing compositions not containing a curing additive.

The polymerization of cationically-polymerizable materials, specifically epoxide group-containing materials, in the absence of curing additives is, however, well known. Among such processes are those in which the polymerization catalyst (also called sensitizer or initiator) is (1) a radiation-sensitive onium salt of a Lewis acid (e.g. diazonium salts as is described in U.S. Pat. No. 3,794,576 and U.S. Pat. No. 4,080,274; halonium salts as is disclosed in U.S. Pat. No. 4,026,705; and the onium salts of Group VIA elements, particularly the sulfonium salts, as are disclosed in U.S. Pat. No. 4,058,400); (2) a dicarbonyl chelate compound of a Group IIIA—VA element as is disclosed in U.S. Pat. No. 4,086,091; (3) a silver salt which is used for the polymerization of tetrahydrofuran as is described by Woodhouse, et al., J. Am. Chem. Soc. 100, 996 (1978); and (4) titanocene dichloride which is used for the polymerization of epichlorohydrin and 2-chloroethylvinyl ether as is described by Kaerijama et al., J. Polym. Sci., Chem. Ed. 10, 2833 (1972) and Ibid. 14, 1547 (1976). Compositions containing the above-mentioned catalysts are unsatisfactory because without the addition of optical sensitizers they are limited to ultraviolet radiation for polymerization. Furthermore, the dicarbonyl chelates are moisture sensitive and the titanocene dichloride requires a co-catalyst.

DISCLOSURE OF THE INVENTION

The present invention provides a process for the polymerization of cationically-sensitive materials utilizing as catalyst a cationic compound which is a salt of an organometallic complex cation. By selection of the metal and ligands in the organometallic complex and the counterion used, the relative thermal stability and wavelength of sensitivity (from 200 to 600 nm) can be adapted for various applications.

In accordance with the present invention there is provided energy-curable compositions comprising: p1
a) a cationically-polymerizable material and
b) a catalytically-effective amount of an ionic salt of an organometallic complex cation sufficient to effect polymerization, said ionic salt of an organometallic complex cation being capable of adding an intermediate strength nucleophile such as triphenylphosphine or upon photolysis capable of liberating at least one coordination site, said metal of said organometallic complex cation being selected from elements of Periodic Groups IVB, VB, VIB, VIIB, and VIIIB.

There is also provided a process for the polymerization of cationically sensitive material comprising the steps of:
a) mixing the cationically-sensitive material with a catalytically-effective amount of the ionic salt of an organometallic complex cation, thereby forming a mixture, and
b) allowing the mixture to polymerize or adding energy to the mixture to effect polymerization thereof.

As used in this application:
"catalytically effective amount" means a quantity sufficient to effect polymerization of the cationically-polymerizable material at least to a degree to increase the viscosity of the composition, and
"intermediate strength nucleophile" means a nucleophile intermediate in strength between hydride and chloride, e.g., trialkyl- and triarylphosphines, trialkyl- and triarylphosphites, pyridines, and anilines.

DETAILED DESCRIPTION OF THE INVENTION

The ionic salts of the organometallic complex cations useful in the compositions and processes of the invention are compounds having the formula:

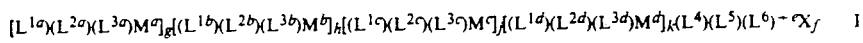

$$[L^{1a}(L^{2a})(L^{3a})M^a]_g[(L^{1b})(L^{2b})(L^{3b})M^b]_h[(L^{1c})(L^{2c})(L^{3c})M^c]_j[(L^{1d})(L^{2d})(L^{3d})M^d]_k(L^4)(L^5)(L^6)^{+e}X_f \quad I$$

wherein $M^a$, $M^b$, $M^c$, and $M^d$ represent metal atoms which may be the same or different selected from the elements of Periodic Groups IVB, VB, VIB, VIIB, and VIIIB;

with the proviso that Formula I can represent a mononuclear, binuclear, trinuclear, or tetranuclear complex compound comprising $M^a$, $M^aM^b$, $M^aM^bM^c$, or $M^aM^bM^cM^d$ respectively with their attendent ligands, L;

each $L^{1a}$, $L^{1b}$, $L^{1c}$, and $L^{1d}$ represents none, or 1, 2, or 3 ligands contributing $\pi$-electrons that can be the same or different ligand selected from substituted and unsubstituted acyclic and cyclic unsaturated compounds and groups and substituted and unsubstituted carbocyclic aromatic and heterocyclic aromatic compounds, each capable of contributing two to twelve π-electrons to the valence shell of $M^a$, $M^b$, $M^c$, and $M^d$, respectively;

each $L^{2a}$, $L^{2b}$, $L^{2c}$, and $L^{2d}$ represents none, or 1 to 6 ligands contributing an even number of σ-electrons that can be the same or different selected from mono-, di-, and tri-dentate ligands, each donating 2, 4, or 6 σ-electrons to the valence shell of $M^a$, $M^b$, $M^c$, and $M^d$, respectively;

each $L^{3a}$, $L^{3b}$, $L^{3c}$, and $L^{3d}$ represents none, 1, or 2 ligands contributing one σ-electron each to the valence shell of $M^a$, $M^b$, $M^c$, and $M^d$, respectively;

$L^4$ represents none, or 1 to 6 bridging ligands containing σ-electrons that can be the same or different ligand selected from substituted and unsubstituted acyclic and cyclic unsaturated compounds and groups and substituted and unsubstituted carbocyclic aromatic and heterocyclic aromatic compounds, each capable of acting as a bridging ligand contributing 2 to 24 π-electrons to the valence shells of two or more metal atoms $M^a$, $M^b$, $M^c$, or $M^d$ simultaneously;

$L^5$ represents none, or 1 to 12 bridging ligands contributing an even number of σ-electrons that can be the same or different selected from mono-, di-, and tri-dentate ligands, each donating 2, 4, or 6 σ-electrons to the valence shells of two or more metal atoms $M^a$, $M^b$, $M^c$, or $M^d$ simultaneously;

$L^6$ represents none or 1 to 12 bridging ligands contributing 1, 2, 3, or 4 σ-electrons to the valence shells of two or more metal atoms $M^a$, $M^b$, $M^c$, or $M^d$ simultaneously; with the proviso that the total electronic charge contributed to $M^a$, $M^b$, $M^c$, and $M^d$ by the ligands $L^{1a}$, $L^{2a}$, $L^{3a}$, $L^{1b}$, $L^{2b}$, $L^{3b}$, $L^{1c}$, $L^{2c}$, $L^{3c}$, $L^{1d}$, $L^{2d}$, $L^{3d}$, $L^4$, $L^5$, and $L^6$ plus the sum of ionic charge on $M^a$, $M^b$, $M^c$, and $M^d$ results in a residual net positive charge of e to the complex;

e is an integer having a value of 1, 2, or 3, the residual electrical charge of the complex cation;

X is a halogen-containing complex anion of a metal or metalloid;

f is an integer of 1 to 3, the number of complex anions required to neutralize the charge e on the complex cation; and g, h, j, and k independently are 0 or 1, with at least one of them being equal to 1.

By Periodic Group IVB is meant the elements Ti, Zr, and Hf.

By Periodic Group VB is meant the elements V, Nb, and Ta.

By Periodic Group VIB is meant the elements Cr, Mo, and W.

By Periodic Group VIIB is meant the elements Mn, Tc, and Re, and

By periodic Group VIIIB is meant the elements Fe, Ru, Os, Co, Rh, Ir, Ni, Pd, and Pt.

In a preferred composition of the invention, the salts of the organometallic cation have the formula:

$$[(L^7)(L^8)_sM^m]^{+e}X_f$$  II wherein $M^m$ represents a metal selected from elements of the Periodic Groups IVB, VB, VIB, VIIB, and VIIIB;

$L^7$ represents none, one or two ligands contributing π-electrons that can be the same or different ligand selected from the same group of ligands from which $L^{1a}$, $L^{1b}$, $L^{1c}$, and $L^{1d}$ ligands of Formula I is selected;

$L^8$ represents none or 1 to 6 ligands contributing an even number of σ-electrons that can be the same or different ligand selected from the same group of ligands from which $L^{2a}$, $L^{2b}$, $L^{2c}$, and $L^{2d}$ ligands of Formula I is selected;

with the proviso that the total electronic charge contributed to $M^m$ by $L^7$ and $L^8$ plus the ionic charge on $M^m$ results in a residual net positive charge of e to the complex; and e, f, and X have the same definition as given in Formula I.

In a most preferred composition of the invention, the salts of the organometallic cation are novel and have the formula:

$$[(L^9)(L^{10})M^p]^{+q}Y_n$$  III wherein $M^p$ represents a metal selected from Cr, Mo, W, Mn, Re, Fe, and Co;

$L^9$ represents 1 or 2 ligands contributing π-electrons that can be the same or different ligand selected from substituted and unsubstituted $\eta^3$-allyl, $\eta^5$-cyclopentadienyl, and $\eta^7$-cycloheptatrienyl and $\eta^6$-aromatic compounds selected from $\eta^6$-benzene and substituted $\eta^6$-benzene compounds and compounds having 2 to 4 fused rings each capable of contributing 3 to 8 π-electrons to the valence shell of $M^p$;

$L^{10}$ represents none or 1 to 3 ligands contributing an even number of σ-electrons that can be the same or different ligand selected from carbon monoxide or nitrosonium;

with the proviso that the total electronic charge contributed to $M^p$ by $L^9$ and $L^{10}$ plus the ionic charge on metal $M^p$ results in a net residual positive charge of q to the complex, and q is an integer having a value of 1 or 2, the residual electrical charge of the complex cation;

Y is a halogen-containing complex anion selected from $AsF_6^-$, $SbF_6^-$ and $SbF_5OH^-$; and n is an integer having a value of 1 or 2, the numbers of complex anions required to neutralize the charge q on the complex cation.

Salts of organometallic cations having Formulas I, II, and III are radiation sensitive in addition to being thermally sensitive.

All ligands $L^{1a}$ to $L^{10}$ are well known in the art of transition metal organometallic compounds.

Ligands $L^{1a}$, $L^{1b}$, $L^{1c}$, and $L^{1d}$ in Formula I, and $L^7$ in Formula II, are provided by any monomeric or polymeric compound having an accessible unsaturated group, i.e., an ethylenic $$-\overset{|}{C}=\overset{|}{C}-$$

group; acetylenic, —C≡C— group; or aromatic group which have accessible π-electrons regardless of the total molecular weight of the compound. By "accessible", it is meant that the compound (or precursor compound from which the accessible compound is prepared) bearing the unsaturated group is soluble in a reaction medium, such as an alcohol, e.g., methanol; a ketone, e.g., methyl ethyl ketone; an ester, e.g., amyl acetate; a halocarbon, e.g., trichloroethylene; an alkane, e.g., decalin; an aromatic hydrocarbon, e.g., anisole; an ether, e.g., tetrahydrofuran; etc, or that the compound is divisible into very fine particles of high surface area so that the unsaturated group (including aromatic group) is sufficiently close to a metal atom to form a $\pi$-bond joining the unsaturated group to the metal atom. By polymeric compound, it is meant, as explained below, that the ligand can be a group on a polymeric chain.

Illustrative of ligands $L^{1a}$, $L^{1b}$, $L^{1c}$, $L^{1d}$, and $L^7$ are the linear and cyclic olefinic and acetylenic compounds having less than 100 carbon atoms, preferably having less than 60 carbon atoms, and up to 10 hetero atoms selected from nitrogen, sulfur, oxygen, phosphorus, arsenic, selenium, boron, antimony, tellurium, silicon, germanium, and tin, such as, for example, ethylene, acetylene, propylene, methylacetylene, 1-butene, 2-butene, diacetylene, butadiene, 1,2-dimethylacetylene, cyclobutene, pentene, cyclopentene, hexene, cyclohexene, 1,3-cyclohexadiene, cyclopentadiene, 1,4-cyclohexadiene, cycloheptene, 1-octene, 4-octene, 3,4-dimethyl-3-hexene, and 1-decene; $\eta^3$-allyl, $\eta^3$-pentenyl, norbornadiene, $\eta^5$-cyclohexadienyl, $\eta^6$-cycloheptatriene, $\eta^8$-cyclooctatetracene, and substituted and unsubstituted carbocyclic and heterocyclic aromatic ligands having up to 25 rings and up to 100 carbon atoms and up to 10 hetero atoms selected from nitrogen, sulfur, oxygen, phosphorus, arsenic, selenium, boron, antimony, tellurium, silicon, germanium, and tin, such as, for example, $\eta^5$-cyclopentadienyl, $\eta^6$-benzene, $\eta^6$-mesitylene, $\eta^6$-hexamethylbenzene, $\eta^6$-fluorene, $\eta^6$-naphthalene, $\eta^6$-anthracene, $\eta^6$-chrysene, $\eta^6$-pyrene, $\eta^7$-cycloheptatrienyl, $\eta^6$-triphenylmethane, $\eta^{12}$-paracyclophane, $\eta^{12}$-1,4-diphenylbutane, $\eta^5$-pyrrole, $\eta^5$-thiophene, $\eta^5$-furan, $\eta^6$-pyridine, $\eta^6$-97-picoline, $\eta^6$-quinaldine, $\eta^6$-benzopyran, $\eta^6$-thiochrome, $\eta^6$-benzoxazine, $\eta^6$-indole, $\eta^6$-acridine, $\eta^6$-carbazole, $\eta^6$-triphenylene, $\eta^6$-silabenzene, $\eta^6$-arsabenzene, $\eta^6$-stibabenzene, $\eta^6$-2,4,6-triphenylphosphabenzene, $\eta^5$-selenophene, $\eta^6$-dibenzostannepine, $\eta^5$-tellurophene, $\eta^6$-phenothiarsine, $\eta^6$-selenanthrene, $\eta^6$-phenoxaphosphine, $\eta^6$-phenarsazine, $\eta^6$-phenatellurazine, and $\eta^6$-1-phenylborabenzene. Other suitable aromatic compounds can be found by consulting any of many chemical handbooks.

As mentioned before, the ligand can be a unit of a polymer, for example the phenyl group in polystyrene, poly(styrene-cobutadiene), poly(styrene-comethyl methacrylate), poly($\alpha$-methylstyrene), polyvinylcarbazole, and polymethylphenylsiloxane; the cyclopentadiene group in poly(vinylcyclopentadiene), poly($\eta^4$-cyclopentadiene); the pyridine group in poly(vinylpyridine), etc. Polymers having a weight average molecular weight up to 1,000,000 or more can be used. It is preferable that 5 to 50 percent of the unsaturated or aromatic groups present in the polymer be complexed with metallic cations.

Each of the ligands $L^{1a}$, $L^{1b}$, $L^{1c}$, $L^{1d}$, and $L^7$ can be substituted by groups that do not interfere with the complexing of the ligand with the metal atom or which do not reduce the solubility of the ligand to the extent that complexing with the metal atom does not take place. Examples of substituting groups, all of which preferably have less than 30 carbon atoms and up to 10 hetero atoms selected from nitrogen, sulfur, oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, benzoxy, and cyclohexanecarbonyloxy; hydrocarbylcarbonamido, e.g., acetamido, benzamido; azo; boryl; halo, e.g., chloro, iodo, bromo, and fluoro; hydroxy; cyano; nitro; nitroso, oxo; dimethylamino; diphenylphosphino, diphenylarsino; diphenylstibine; trimethylgermane; tributyltin; methylseleno; ethyltelluro; and trimethylsiloxy; condensed rings such as benzo, cyclopenta; naphtho, indeno; and the like.

Ligands $L^{2a}$, $L^{2b}$, $L^{2c}$, and $L^{2d}$ in Formula I, and $L^8$ in Formula II are provided by monodentate and polydentate compounds preferably containing up to about 30 carbon atoms and up to 10 hetero atoms selected from nitrogen, sulfur, oxygen, phosphorus, arsenic, selenium, antimony, and tellurium, in addition to the metal atom, following loss of zero, one, or two hydrogens, the polydentate compounds preferably forming with the metal, $M^a$, $M^b$, $M^c$, $M^d$, and $M^m$, a 4-, 5-, or 6-membered saturated or unsaturated ring. Examples of suitable monodentate compounds or groups are carbon monoxide, carbon sulfide, carbon selenide, carbon telluride, alcohols such as ethanol, butanol, and phenol; nitrosonium (i.e., $NO^+$); compounds of Group VA elements such as ammonia, phosphine, trimethylamine, trimethylphosphine, triphenylamine, triphenylphosphine, triphenylarsine, triphenylstibine, tributylphosphite, isonitriles such as phenylisonitrile, butylisonitrile; carbene groups such as ethoxymethylcarbene, dithiomethoxycarbene; alkylidenes such as methylidene, ethylidene; suitable polydentate compounds or groups include 1,2-bis(diphenylphosphino)ethane, 1,2-bis(diphenylarsino)ethane, bis(diphenylphosphino)methane, ethylenediamine, propylenediamine, diethylenetriamine, 1,3-diisocyanatopropane, and hydridotripyrazolylborate; the hydroxycarboxylic acids such as glycollic acid, lactic acid, salicylic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(perfluoromethyl)-1,2-dithiolene; aminocarboxylic acids such as alanine, glycine and o-aminobenzoic acid; dicarboxylic diamides such as oxalamide, biuret; diketones such as 2,4-pentanedione; hydroxyketones such as 2-hydroxyacetophenone; $\alpha$-hydroxyoximes such as salicyladoxime; ketoximes such as benzil oxime; and glyoximes such as dimethylglyoxime. Other suitable groups are the inorganic groups such as, for example, $CN^-$, $SCN^-$, $F^-$, $OH^-$, $Cl^-$, $Br^-$, $I^-$, and $H^-$ and the organic groups such as, for example, acetoxy, formyloxy, benzoyloxy, etc. As mentioned before, the ligand can be a unit of a polymer, for example the amino group in poly(ethyleneamine); the phosphino group in poly(4-vinylphenyldiphenylphosphine); the carboxylic acid group in poly(acrylic acid); and the isonitrile group in poly(4-vinylphenylisonitrile).

Suitable radicals $L^{3a}$, $L^{3b}$, $L^{3c}$, and $L^{3d}$ in Formula I include any group having in its structure an atom with an unshared electron. Suitable groups can contain any number of carbon atoms and hetero atoms but preferably contain less than 30 carbon atoms and up to 10 hetero atoms selected from nitrogen, sulfur, oxygen, phosphorus, arsenic, selenium, antimony, tellurium, silicon, germanium, tin, and boron. Examples of such groups are hydrocarbyl groups such as methyl, ethyl, propyl, hexyl, dodecyl, phenyl, tolyl, etc.; unsaturated hydrocarbyl groups such as vinyl, allyl, butenyl, cyclohexenyl; the hydrocarbyl derivatives of a Group IVA element such as trimethylgermanium, triphenyltin, and trimethylsilyl, etc.; and organic groups such as formyl, acetyl, propionyl, acryloyl, octadecoyl, benzoyl, toluenesulfonyl, oxalyl, malonyl, o-phthaloyl.

Ligand $L^4$ in Formula I is provided by any monomeric or polymeric compound having an accessible unsaturated group, such as an acetylenic, —C≡C— group or an aromatic group which have accessible π-electrons regardless of the total molecular weight of the compound.

Illustrative of ligand $L^4$ are the linear and cyclic diene and acetylenic compounds preferably having less than 60 carbon atoms and up to 10 hetero atoms selected from nitrogen, sulfur, oxygen, phosphorus, arsenic, selenium, boron, antimony, tellurium, silicon, germanium, and tin, such as for example, acetylene, methylacetylene, diacetylene, butadiene, 1,2-dimethylacetylene, 1,3-cyclohexadiene, cyclopentadiene, and 1,4-cyclohexadiene; $\eta^3$-allyl, $\eta^3$-pentenyl, norbornadiene, $\eta^5$-cyclohexadienyl, $\eta^6$-cycloheptatriene, $\eta^8$-cyclooctatetracene, and substituted and unsubstituted carbocyclic and heterocyclic aromatic ligands having up to 25 rings and up to 100 carbon atoms and up to 10 hetero atoms selected from nitrogen, sulfur, oxygen, phosphorus, arsenic, selenium, boron, antimony, tellurium, silicon, germanium, and tin, such as, for example, $\eta^5$-cyclopentadienyl, $\eta^6$-benzene, $\eta^6$-mesitylene, $\eta^6$-hexamethylbenzene, $\eta^6$-fluorene, $\eta^6$-naphthalene, $\eta^6$-anthracene, $\eta^6$-chrysene, $\eta^6$-pyrene, $\eta^7$-cycloheptatrienyl, $\eta^6$-triphenylmethane, $\eta^5$-pyrrole, $\eta^5$-thiophene, $\eta^5$-furan, $\eta^6$-pyridine, $\eta^6$-Y-picoline, $\eta^6$-quinaldine, $\eta^6$-benzopyran, $\eta^6$-thiochrome, $\eta^6$-benzoxazine, $\eta^6$-indole, $\eta^6$-acridine, $\eta^6$-carbazole, $\eta^6$-(1,2,3,4,4a,12a)-$\eta^6$-(7,8,9,10,10a,10b)chrysene, $\eta^6$-triphenylene, $\eta^6,\eta^6$'-paracyclophane, 06,06'-1,4-diphenylbutane, $\eta^6$-silabenzene, $\eta^6$-arsabenzene, $\eta^6$-stibabenzene, $\eta^6$-2,4,6-triphenylphosphabenzene, $\eta^5$-selenophene, $\eta^6$-dibenzostannepine, $\eta^5$-tellurophene, $\eta^6$-phenothiarsine, $\eta^6$-selenanthrene, $\eta^6$-phenoxaphosphine, $\eta^6$-phenarsazine, $\eta^6$-phenatellurazine, and $\eta^6$-1-phenylborabenzene. Other suitable aromatic compounds can be found by consulting any of many chemical handbooks.

Each of the ligands $L^4$ can be substituted by groups that do not interfere with the complexing of the ligand with the metal atom or which do not reduce the solubility of the ligand to the extent that complexing with the metal atom does not take place. Examples of substituting groups, all of which preferably have less than 30 carbon atoms and up to 10 hetero atoms selected from nitrogen, sulfur, oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, benzoxy, and cyclohexanecarbonyloxy; hydrocarbylcarbonamido, e.g., acetamido, benzamido; azo; boryl; halo, e.g., chloro, iodo, bromo, and fluoro, hydroxy; cyano; nitro; nitroso, oxo; dimethylamino; diphenylphosphino, diphenylarsino; diphenylstibine; trimethylgermane; tributyltin; methylseleno; ethyltelluro; and trimethylsiloxy; condensed rings such as benzo, cyclopenta; naphtho, indeno; and the like.

Ligand $L^5$ is provided by monodentate and polydentate compounds preferably containing up to about 30 carbon atoms and up to 10 hetero atoms selected from nitrogen, sulfur, oxygen, phosphorus, arsenic, selenium, antimony, and tellurium. Examples of suitable monodentate compounds or groups are carbon monoxide, carbon sulfide, carbon selenide carbon telluride, alcohols such as ethanol, butanol, and phenol; nitrosonium (i.e., NO+); compounds of Group VA elements such as triphenylamine, triphenylphosphine, triphenylarsine, triphenylstibine, isonitriles such as phenylisonitrile; suitable polydentate compounds or groups include 1,2-bis(-diphenylphosphino)ethane, 1,2-bis-(diphenylarsino)ethane, bis(diphenylphosphino)methane, ethylenediamine, propylenediamine, diethylenetriamine, 1,3-diisocyanatopropane, and hydridotripyrazolylborate; the hydroxycarboxylic acids such as glycollic acid, lactic acid, salicylic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(-perfluoromethyl)-1,2-dithiolene; aminocarboxylic acids such as alanine, glycine and o-aminobenzoic acid; dicarboxylic diamides such as oxalamide, biuret; diketones such as 2,4-pentanedione; hydroxyketones such as 2-hydroxyacetophenone; a-hydroxyoximes such as salicyladoxime; ketoximes such as benzil oxime; and glyoximes such as dimethylglyoxime. Other suitable groups are the inorganic groups such as, for example, $CN^-$, $SCN^-$, $F^-$, $OH^-$, $Cl^-$, $Br^-$, $I^-$, and $H^-$ and the organic groups such as, for example, acetoxy, formyloxy, benzoyloxy, etc.

Suitable radical $L^6$ in Formula I includes any group having in its structure an atom with two or more unpaired electrons. Suitable groups can contain any number of carbon atoms and hetero atoms but preferably contain less than 30 carbon atoms and up to 10 hetero atoms selected from nitrogen, sulfur, oxygen, phosphorus, arsenic, selenium, antimony, tellurium, silicon, germanium, tin, and boron. Examples of such groups are hydrocarbyl groups such as methenyl, ethenyl, propenyl, hexenyl, dodecenyl, methinyl, and carbide.

Suitable anions, X, in Formulas I and II, of use as the counterion in the ionic salts of the organometallic complex cation in the preferred radiation-sensitive compositions of the invention are those in which X has the formula $DQ_r$, wherein D is a metal from Groups IB to VIIIB or a metal or metalloid from Groups IIIA to VA of the Periodic Chart of Elements, Q is a halogen atom, and r is an integer having a value of 1 to 6. Preferably, the metals are copper, zinc, titanium, vanadium, chromium, manganese, iron, cobalt, or nickel and the metalloids preferably are boron, aluminum, antimony, tin, arsenic, and phosphorus. Preferably, the halogen, Q, of Formula II, is chlorine or fluorine. Illustrative of suitable anions are $BF_4^-$, $PF_6^-$, $AsF_6^-$, $SbF_6^-$, $FeCl_4^-$, $SnCl_5^-$, $SbF_5^=$, $AlF_6^\equiv$, $GaCl_4^-$, $InF_4^-$, $TiF_6^=$, $ZrF_6^-$, etc. Preferably, the anions are $BF_4^-PF_6^-SbF_6^-SbF_5OH^-$, $AsF_6^-$and $SbCl_6^-$. Most preferably, the anions are $AsF_6^-$, $SbF_6^-$, and $SbF_5OH^-$. Some of the organometallic complex salts having these three anions are novel and all of these salts provide compositions of the invention that are relatively more active toward polymerization on exposure to energy than are salts having other anions.

Ligand $L^9$ in Formula III is provided by linear and cyclic olefinic compounds formally described as having lost a hydride or a proton alpha to a double bond from a saturated carbon and having less than 10 carbon atoms and no heteroatoms, such as for example $\eta^3$-allyl, $\eta^3$-butenyl, $\eta^3$-pentenyl, $\eta$3-hexenyl, $\eta^3$-heptenyl, $\eta^3$-octenyl, $\eta^3$-nonenyl, $\eta^3$-decenyl, $\eta^3$-cyclobutenyl, $\eta^3$-cyclopentenyl, $\eta^3$-cyclohexenyl, $\eta$3-cycloheptenyl, $\eta^3$-cyclooctenyl, $\eta^3$-cyclononenyl, $\eta^3$-cyclodecenyl, $\eta^5$-methylcyclopentadienyl, $\eta$5-cyclopentadienyl, $\eta^5$-pentamethylcyclopentadienyl, $\eta^5$-cyclohexadienyl, and $\eta^7$-cycloheptatrienyl (it being understood that both the $\eta^5$-cyclopentadienyl and the $\eta^7$-cycloheptatrienyl ligand may be formally described as an aromatic ligand) and aromatic ligands having up to 4 rings and up to 24 carbon atoms and up to 2 heteroatoms selected from nitrogen, oxygen, and sulfur, such as, for example, $\eta^6$-toluene, $\eta$6-ethylbenzene, $\eta^6$-isopropylbenzene, $\eta^6$-propylbenzene, $\eta^6$-t-butylbenzene, $\eta^6$-m-xylene, $\eta^6$-o-xylene, $\eta^6$-p-xylene, $\eta^6$-1,3,5-trimethylbenzene (mesitylene), $\eta^6$-1,2,4-trimethylbenzene, $\eta^6$-1,3,5-triisopylbenzene, $\eta^6$-1,2,3,4-tetramethylbenzene, $\eta^6$-1,2,3,5-tetramethylbenzene, $\eta^6$-1,2,4,5-tetramethylbenzene (durene), $\eta$6-pentamethylbenzene, $\eta^6$-hexamethylbenzene, $\eta^6$-phenol, $\eta^6$-thiophenol, $\eta$6-anisole, $\eta$6-thioanisole, $\eta^6$-aniline, $\eta^6$-N,N-dimethylaniline, $\eta^6$-diphenyl amine, $\eta$6-diphenylmethane, $\eta^6$-triphenylmethane, $\eta^6$-chlorobenzene, $\eta^6$-bromobenzene, $\eta$6-fluorobenzene, $\eta^6$-cyanobenzene, $\eta$6-nitrobenzene, $\eta^6$-fluorene, $\eta$6-carbazole, $\eta^6$-biphenyl, $\eta^6$-triphenylene, $\eta^6$-naphthalene, $\eta^6$-anthracene, $\eta^6$-phenanthracene, $\eta$6-pyrene, $\eta^6$-chrysene, $\eta$6-tetralin, $\eta^6$-ethoxybenzene, $\eta^6$-benzoic acid, $\eta$6-quinoline, $\eta^6$-isoquinoline, $\eta^6$-indole, $\eta^6$-benzimidazole, $\eta$6-1,2-benzopyrazole, $\eta^6$-benzothiazole, $\eta^6$-benzoxazole, $\eta$6-indan, $\eta^6$-paracyclophane, $\eta^{6}$-1,4-diphenylbutane, $\eta$12-paracyclophane, 012-1,4-diphenylbutane, poly($\eta^6$-styrene), poly($\eta^6$-N-vinylcarbazole), poly($\eta^6$-methylphenylsiloxane), ($\eta^6$-1,2,3,4,4a,9a)-9-(phenylmethylidene)fluorene, and ($\eta^6$-1,2,3,4,4a,9a)-9-(3-phenyl-2-propenylidene)fluorene. The latter two ligands may be mono-substituted by groups selected from methyl, ethyl, propyl, isopropyl, methoxy, ethoxy, hydroxy, nitro, chloro, bromo, amino, and N,N-dimethylamino on the phenyl ring. Also, the latter two ligands may be disubstituted by groups that may be same or different selected from methyl, ethyl, propyl, isopropyl, methoxy, ethoxy, hydroxy, nitro, chloro, bromo, amino, and N,N-dimethylamino on the phenyl ring in the 2,3; 2,4; or 3,4 positions.

There are restrictions on the total sum of electrons donated by the ligands, $L^{1a}$, $L^{2a}$, $L^{3a}$, $L^{1b}$, $L^{2b}$, $L^{3b}$, $L^{1c}$, $L^{2c}$, $L^{3c}$, $L^{1d}$, $L^{2d}$, $L^{3d}$, $L^4$, $L^5$ and $L^6$ of Formula I, $L^7$ and $L^8$ of Formula II, and $L^9$ and $L^{10}$ of Formula III and the valence electrons possessed by the metal, $M^a$, $M^b$, $M^c$, $M^d$, $M^m$, and $M^p$ For most complex compounds not involving intramolecular metal-metal bonding, this sum is governed by the "eighteen electron rule" [see J. Chem. Ed., 46, 811 (1969)]. This rule is sometimes called the "nine orbital rule", "the effective number rule", or the "rare gas rule". This rule states that the most stable organo-metallic compounds tend to be those compounds in which the sum of the electrons donated by the ligands and the metal is eighteen. Those skilled in the art, however, know that there are exceptions to this rule and that organometallic complex compounds having a sum of 16, 17, 19, and 20 electrons are also known. Therefore, ionic salts of organometallic complex cations not including intramolecular metal-metal bonding are described by Formulas I, II, and III in which complexed metal $M^a$, $M^b$, $M^c$, $M^d$, $M^m$ and $M^p$ have a total sum of 16, 17, 18, 19, or 20 electrons in the valence shell and a residual net positive charge of 1, 2 or 3 are included within the scope of the invention.

For complex compounds described in Formula I in which intramolecular metal-metal bonding exists serious departure from the "eighteen electron rule" can occur. It has been proposed [J. Amer. Chem. Soc. 100, 5305 (1978)] the departure from the "eighteen electron rule" in these transition metal complexes is due to the metal-metal interactions destabilizing the metal p orbitals to an extent to cause them to be unavailable for ligand bonding. Hence, rather than count electrons around each metal separately in a metal cluster, cluster valence electrons (CVE) are counted. A dinuclear complex, $M^aM^b$, is seen to have 34 CVEs, a trinuclear complex, $M^aM^bM^c$, 48 CVEs, and a tetranuclear complex, $M^aM^bM^cM^d$, having tetrahedron, butterfly, and square planar geometry is seen to have 60, 62, or 64 CVEs, respectively. Those skilled in the art, however, know that there are exceptions to this electron counting method and that organometallic complex cluster compounds having a sum of 42, 44, 46, 50 CVEs for a trinuclear complex and 58 CVEs for a tetranuclear complex are also known. Therefore, ionic salts of di, tri, or tetranuclear organometallic complex cations are described by Formula I in which the complexed metal cluster, $M^aM^b$, $M^aM^bM^c$, or $M^aM^bM^cM^d$ has a total sum of 34; 42, 44, 46, 48, 50; or 58, 60, 62, 64 CVEs in the valence shell, respectively, and a residual net positive charge of 1, 2, or 3 are included within the scope of this invention.

Suitable organometallic complex ionic salts described by Formulas I, II, III of use in the compositions of the invention are those salts that upon application of sufficient energy, either thermal or electromagnetic radiation having a wavelength from about 200 to 600 nm, will generate an active species capable of initiating cationic polymerization. The level of cationic activity will, of course, depend on the choice of metal, ligands, and counterions in the salt.

Suitable ionic salts that are activated by heat to initiate cationic polymerization are those that will add an intermediate strength nucleophile such as substituted or unsubstituted trialkyl- and triarylphosphines (preferably triphenylphosphine), trialkyl- and triarylphosphites, pyridines, and anilines. Examples of such compounds are described in Tetrahedron, 34, 3047 (1978) and "Carbonium Ions", 5, Chapter 37, 1976, Wiley-Interscience, New York. These reviews contain references to the experimental procedures used to determine if a particular compound will add such a nucleophile.

Suitable ionic salts that are activated by electromagnetic radiation to initiate cationic polymerization are those that upon photolysis liberate at least one coordination site on the metal. The ability to liberate at least one coordination site upon photolysis can be verified by doing a ligand exchange experiment. In such an experiment, the compound

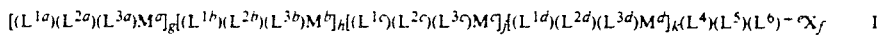

is photolyzed in the presence of a potential entering ligand L (L can be of the $L^1$ or $L^2$ types). That L has indeed added or exchanged with at least one ligand $L^1$ to $L^6$ of Formula I can be determined by any number of analytical techniques. It is particularly convenient for this determination to use some spectroscopic technique to monitor the reaction before, during, and after photolysis. If L or at least one of the $L^{2a}$, $L^{2b}$, $L^{2c}$, $L^{2d}$, or $L^5$ ligands is carbon monoxide, then infrared spectroscopy is a well suited technique to monitor the reaction. Otherwise UV/visible or NMR spectroscopy can be employed. The spectrum before photolysis can be compared with that taken after completion of the reaction to determine if the suspected ligand substituted product is present. A more rigorous method would involve isolation of the photoproduct after completion of the reaction and use of an analytical technique such as elemental analysis to verify that L has indeed entered the coordination sphere of the metal. The proper conditions under which the ligand exchange experiment should be carried out, i.e. organometallic ionic salt concentration, identity of the entering ligand, entering ligand concentration, choice of solvent, irradiation wavelength, irradiation time, light source, light source intensity, reaction vessel, presence or absence of oxygen, analysis technique, etc. must be adjusted by the experimentalist for the particular system under study. Examples of the conditions which have been used to study ligand exchange reactions are contained in "Organometallic Photochemistry", 1979, Academic Press, New York, and references therein, and in *Inorg. Chem.*, 19, 3007 (1980).

Examples of suitable salts of organometallic complex cations useful in the composition of the invention include the following (proposed structures of typical compounds are shown at the end of the list):

($\eta^5$-cyclopentadienyl)tricarbonyliron(1+) hexafluorophosphate$^{(a)}$
($\eta^5$-cyclopentadienyl)dicarbonylthiocarbonyliron(1+) tetrafluoroborate
($\eta^5$-cyclopentadienyl)carbonylbis(triphenylstibine)iron(1+) hexafluorophosphate
($\eta^5$-cyclopentadienyl)tricarbonylruthenium(1−) tetrachloroferrate
($\eta^5$-cyclopentadienyl)dicarbonyltriphenylstibineiron(1+) hexafluoroantimonate
($\eta^5$-methylcyclopentadienyl)dicarbonylnitrosylmanganese(1+) hexafluoroantimonate$^{(b)}$
($\eta^5$-methylcyclopentadienyl)($\eta^3$-allyl)dicarbonylmanganese(1+) tetrafluoroborate$^{(c)}$
($\eta^5$-cyclopentadienyl)tetracarbonylmolybdenum(1+) hexafluorophosphate
($\eta^5$-pentadienyl)tricarbonyliron(1+) tetrafluoroborate
($\eta^5$-cyclohexadienyl)tricarbonyliron(1+) hexafluoroarsenate$^{(d)}$
($\eta^5$-cyclohexadienyl)(ethylidene)carbonyltriphenylphosphineiron(1+) tetrafluoroborate
($\eta^5$-cyclopentadienyl)(ethoxymethylcarbene)carbonyltriphenylphosphineiron(1+) tetrafluoroborate
($\eta^5$-cyclopentadienyl)(dithiomethoxycarbene)dicarbonyliron(1−) hexafluorophosphate
($\eta^5$-cyclopentadienyl)dicarbonylmethylisonitrileiron(1+) hexafluoroarsenate
bis($\eta^5$-cyclopentadienyl)($\eta^2$-ethylene)($\sigma$-methyl)tungsten(1+) hexafluorophosphate
($\eta^6$-toluene)tricarbonylmanganese(1+) hexafluoroantimonate$^{(e)}$
($\eta^6$-mesitylene)tricarbonylrhenium(1+) hexafluoroantimonate
($\eta^7$-cycloheptatrienyl)tricarbonylchromium(1+) hexafluorophosphate
($\eta^7$-cycloheptatrienyl)tricarbonyltungsten(1+) hexafluoroarsenate$^{(f)}$
($\eta^5$-cyclopentadienyl)($\eta^2$-1-pentene)dicarbonyliron(1+) tetrafluoroborate
($\eta^6$-benzene)($\eta^5$-cyclopentadienyl)iron(1+) hexafluorophosphate
($\eta^6$-mesitylene)($\eta^5$-cyclopentadienyl)iron(1+) tetrafluoroborate
($\eta^6$-naphthalene)($\eta^5$-cyclopentadienyl)iron(1+) hexafluoroantimonate
($\eta^6$-acetophenone)($\eta^5$-methylcyclopentadienyl)iron(1+) hexafluoroarsenate
bis($\eta^5$-cyclopentadienyl)cobalt(1+) hexafluorophosphate
bis($\eta^5$-cyclopentadienyl)iron(1+) hexafluoroantimonate
bis($\eta^5$-chlorocyclopentadienyl)nickel(1+) hexafluorophosphate
bis($\eta^6$-benzene)chromium(1+) hexafluoroantimonate$^{(g)}$
bis($\eta^6$-hexamethylbenzene)cobalt(2+) hexafluoroarsenate
bis($\eta^6$-hexamethylbenzene)nickel(2+) hexafluoroantimonate
tetracarbonyltriphenylphosphinecobalt(1+) hexafluorophosphate
tricarbonylbis(triphenylphosphine)iridium(1+) hexafluorophosphate
($\eta^3$-allyl)pentacarbonylchromium(1+) tetrafluoroborate pentacarbonylnitrosylmolybdenum(1−) hexafluorophosphate
($\eta^3$-allyl)tetracarbonyliron(1+) hexafluoroantimonate hexacarbonylrhenium(1+) hexafluoroantimonate
bis($\eta^6$-mesitylene)iron(2+) hexafluoroantimonate$^{(h)}$
bis($\eta^6$-hexamethylbenzene)manganese(1+) tetrafluoroborate
bis($\eta^6$-mesitylene)vanadium(1+) hexafluorophosphate
($\eta^7$-cycloheptatrienyl)($\eta^5$-cyclopentadienyl)manganese(1+) hexafluoroarsenate
($\eta^8$-cyclooctatetrenyl)($\eta^5$-cyclopentadienyl)chromium(1+) hexafluorophosphate
($\eta^6$-fluorene)($\eta^5$-cyclopentadienyl)iron(1+) hexafluorophosphate$^{(i)}$
($\eta^6$-1-phenylborabenzene)($\eta^5$-cyclopentadienyl)cobalt(1+) hexafluorophosphate
($\eta^5$-cyclopentadienyl)($\eta^5$-N-methylpyrrolyl)iron(1+) hexafluorophosphate
($\eta^6$-2,3,4,5-tetrathiomethoxybenzene)($\eta^5$-cyclopentadienyl)-iron(1+) hexafluoroarsenate
[($\eta^6$-1,2,3,4,5,6)($\eta^6$-7,8,9,10,11,12)biphenyl]bis($\eta^5$-cyclopentadienyl)diiron(2+) tetrafluoroborate
[($\eta^6$-1,2,3,4,4a,9a)($\eta^6$-5,6,7,8,8a,5a)fluorene]bis($\eta^5$-cyclopentadienyl)diiron(2−) hexafluorophosphate
[($\eta^6$-1,2,3,4,4a,9a)($\eta^6$-5,6,7,8,8a,5a)fluorene]bis-($\eta^6$-benzene)diiron(4+) hexafluorophosphate

[(η⁶-1,2,3,4,4a,12a)(η⁶-7,8,9,10,10a,6a)chrysene]-bis(η⁶-benzene)dichromium(2+) hexafluoroantimonate dicarbonylbis(diphenylphosphino)ethane]bis(η⁵-cyclopentadienyl)diiron(1+) hexafluorophosphate tetra[(η5-cyclopentadienyl)carbonyliron](1+) hexafluorophosphate tris[(η⁶-benzene)cobalt]dicarbonyl(1+) hexafluorophosphate tris(η⁵-cyclopentadienyl)dinickel(1+) hexafluorophosphate

[(η⁶-1,2,29,18c,18b,18a)(η⁶-7,8,8a,18i,18h,7a)(η⁶-1-3,14,-14a,18o,18n,12a)(η⁶-18t,18u,18v,18w,18x,18y)-tripyreno-(2,1,10,9,8,7-defghij:2',1',10',9',8',7'-nopqrst: 2",1",10",9",8",7"-xyza,b,c,d(trinaphthalene]tetra(η⁵-cyclopentadienyl)tetrairon(4+) hexafluoroantimonate

[(η⁶-4,5,5a,28c,28b,3a)(η⁶-8a,8b,20d,22a,22b,24c)-1H,14H-dipyrano(3,4,5, gh: 3',4',5'-g'h')anthra(2",1",9": 4,5,6;6",5",10":4',5',6')diisoquino(2,1-a:2',1'-a])diperimidine]bis(η5-cyclopentadienyl)diiron(2+) hexafluoroantimonate

[6-1,2,3,3a,13b,13a)benzo(10,11)chryseno(2,3-d)(1,3)-dioxole](η⁵-methylcyclopentadienyl)iron(1+) hexafluorophosphate

[(η⁶-1,2,3,3a,16c,16b)(η⁶-9,10,11,11a,13c,8b)cycloocta(1,2,3,4-def:5,6,7,8-d'e'f')diphenanthrene]bis(η⁵-acetylcyclopentadienyl)diiron(2+) tetrafluoroborate bis(η⁵-acetylcyclopentadienyl)iron(1+) tetrafluoroborate

[(η⁶-1,2,3,4,4a,42a)(η⁶-16,17,18,19,19a,15a)(η⁶-30,31,32, 32a,32b,29a)naphth(8',1',2':6,5,10)anthra(2,3-i)naphth(2'", 3'":6",7")indolo(2",3":5'6'-)naphth(2'3':4,5)-indolo(2,3-g)naphtho(2,3-i')benzo(1,2-a:4,5-a')dicar-bazole]tris(η⁵-cyclopentadienyl)triiron(3+) hexafluoroantimonate (η³-1-methyl-allyl)tricarbonyliron(+1) hexafluorophosphate (η³-1,3-dimethyl-allyl)tricarbonyliron(+1) hexachloroantimonate

[(η⁵-cyclopentadienyl)nickelnonacarbonyltricobalt](+1) hexafluorophosphate

Di-(μ-carbonyltricarbonyl)(dicarbonyliron)(hexacarbonyl-μ-hydrodiruthenium)-μ-hydro-osmium(-2Fe—Ru)(Fe—Os)-(20s-Ru)(Ru—Ru)(+1) hexafluorophosphate⁽ʲ⁾

Tetra-μ-hydrotetrakis[(1,2,3,4,5-η)-1,2,3,4,5-pentamethyl2,4-cyclopentadienyl-1-yl]-tetra-tetrahedro-rhodium-(+2) bis(hexafluorophosphate)⁽ᵏ⁾

Bix(μ-diphenylphosphido-μ-carbonyl-π-methylcyclopentadienylcarbonyliron)rhodium(2-Rh—Fe)(+1) hexafluorophosphate(l)

Di-μ-carbonylpentacarbonyl-μ-carbonyldi-π-cyclopentadienyldirhodio)diiron(Fe-Fe)(4Fe-Rh)(Rh-Rh)(+1) hexafluoroarsenate⁽ᵐ⁾

Di-μ3-carbonyltricarbonylbis(π-cyclopentadienylnickelio)-iron(2Fe-Ni)(Ni-Ni)(+1) hexafluoroantimonate⁽ⁿ⁾

(a)

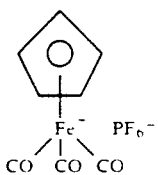

(b)

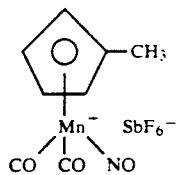

(c)

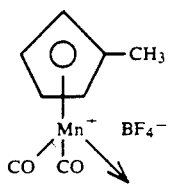

(d)

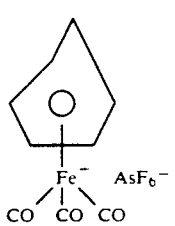

(e)

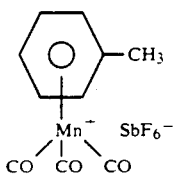

(f)

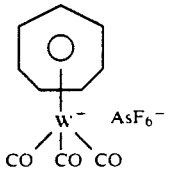

(g)

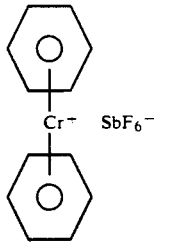

(h)

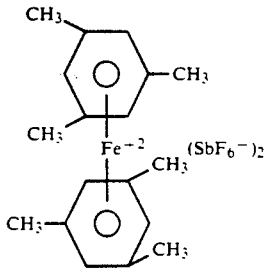

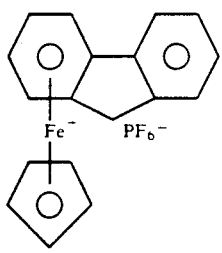

$C_{13}H_2FeO_{13}OsRu_2PF_6$

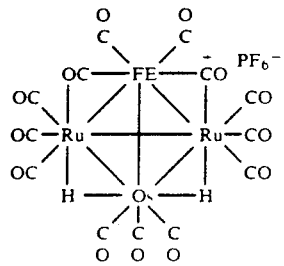

$C_{40}H_{64}Rh_4P_2F_{12}$

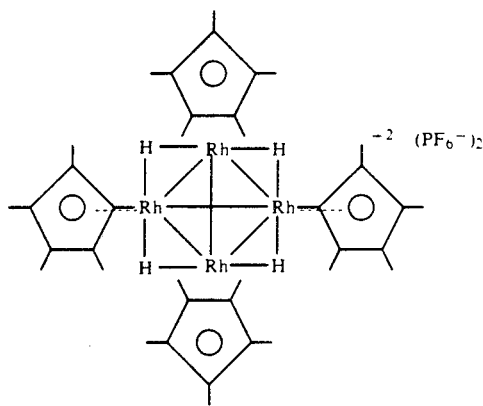

$C_{40}H_{34}Fe_2{}_4P_2RhPF_6$

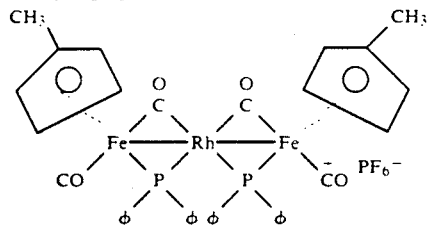

$C_{18}H_{10}Fe_2O_8Rh_2AsF_6$

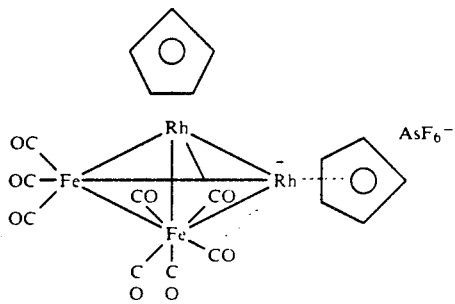

$C_{15}H_{10}FeNi_2O_5SbF_6$ (i)

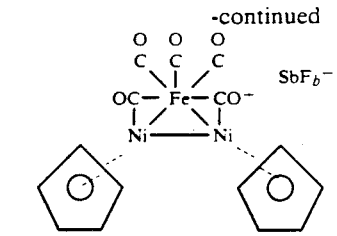

(j)

(k)

(l)

(m)

(n)

Cationically polymerizable materials that can be cured or polymerized by teh compounds of this invention, using the latter in a catalytically effective amount, are those known to undergo cationic polymerization and include 1,2-, 1,3-, and 1,4-cyclic ethers (also designated as 1,2-, 1,3-, and 1,4-epoxides), vinyl ethers, N-vinyl compounds, ethylenically unsaturated hydrocarbons, cyclic formals, and cyclic organosiloxanes. An extensive list of cationically polymerizable monomers which can be used in this invention are given in U.S. Pat. Nos. 3,347,676 and 3,842,019.

The cyclic ethers which can be polymerized in accordance with this invention include those described in "Ring-Opening Polymerizations", Vol. 2, by Frisch and Reegan, M$^a$rcel Dekker, Inc. (1969). Suitable 1,2-cyclic ethers are the monomeric and polymeric types of epoxides. They can be aliphatic, cycloaliphatic, aromatic, or heterocyclic and will typically have an epoxy equivalency of from 1 to 6, preferably 1 to 3. Particularly useful are the aliphatic, cycloaliphatic, and glycidyl ether type 1,2-epoxides such as propylene oxide, epichlorohydrin, styrene oxide, vinylcyclohexene oxide, vinylcyclohexene dioxide, glycidol, butadiene oxide, glycidyl methacrylate, diglycidyl ether of bisphenol A, 3,4-epoxycyclohexylmethyl3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, and epoxy silicones, e.g., dimethylsiloxanes having cycloaliphatic epoxide or glycidyl ether groups. A wide variety of commercial epoxy resins are available and listed in "Handbook of Epoxy Resins" by Lee and Neville, M$^c$ Graw Hill Book Company, New York (1967) and in "Epoxy Resin Technology" by P. F. Bruins, John Wiley & Sons, New York (1968). Representative of the 1,3- and 1,4-cyclic ethers which can be polymerized in accordance with this invention are oxetane, 3,3-bis(chloromethyl)oxetane, and tetrahydrofuran.

Another useful class of cationically-sensitive monomers which can be polymerized in accordance with this invention is represented by the general formula:

$$CH_2=C(Y)XR',$$

where X is —O— or —NR"— (where R" is hydrogen or lower alkyl), R' is hydrocarbyl, hydrocarbylcarbonyl, halohydrocarbyl, or hydroxyhydrocarbyl when X is oxygen, or R' is hydrocarbyl, hydrocarbylcarbonyl, or hydrocarbylsulfonyl when X is nitrogen, and Y is hydrogen, alkyl, aryl, or other hydrocarbyl, or R' (as hydrocarbylcarbonyl) and R" can be connected to form a 5- or 6-membered cyclic structure containing nitrogen as a hetero ring atom. The term "hydrocarbyl" is used herein in its usual sense to mean alkyl, alkenyl, aryl, cycloalkyl, cycloalkenyl, alkaryl, arylalkyl, and the like. In general, monomers of this type contain a vinyl group and are typified by vinyl alkyl ethers, such as vinyl methyl ether, vinyl ethyl ether, vinyl n-butyl ether, vinyl 2-chloroethyl ether, vinyl isobutyl ether, vinyl phenyl ether and vinyl 2-ethylhexyl ether, vinyl ethers of substituted aliphatic alcohols such as 1,4-di(ethenoxy)butane, vinyl 4-hydroxybutyl ether, and N-vinyl compounds such as N-vinyl-N-methyl octanesulfonamide and N-vinylpyrrolidone. A description of vinyl monomers and their use in preparing polymers is set forth in "Vinyl and Related Polymers," by Schildknecht, published by John Wiley & Sons, Inc., New York (1952).

Other cationically-sensitive monomers which can be polymerized in this invention include ethylenically unsaturated hydrocarbons such as isobutylene, 1,3-butadiene, isoprene, styrene, and divinylbenzene; cyclic formals such as trioxane, 1,3-dioxolane, 2-vinyl-1,3-dioxolane and 2-methyl-1,3-dioxolane; and cyclic siloxanes which can contain various groups attached to the silicon atom such as a hydrocarbon radical (alkyl, aryl, alkaryl), an alkenyl hydrocarbon radical (vinyl, allyl or acryloyloxy-alkyl), a halogenated hydrocarbon radical, a carboxy-containing hydrocarbon radical or ester group, a cyanohydrocarbon radical, hydrogen, halogen or a hydroxy group. Representative cyclic siloxanes are hexamethylcyclotrisiloxane, octamethylcyclotetrasiloxane, phenylheptamethylcyclotetrasiloxane, vinylheptamethylcyclotetrasiloxane, methacryloyloxymethylheptamethylcyclotetrasiloxane, 2-bromoethylheptamethylcyclotetrasiloxane,3-chloropropylheptamethylcyclotetrasiloxane, 1,2,3-tri(3,3,3-trifluoropropyl)trimethylcyclotrisiloxane, acetoxymethylheptamethylcyclotetrasiloxane, cyanomethylheptamethylcyclotetrasiloxane, 1,2,3-trihydrotrimethylcyclotrisiloxane, and chloroheptamethylcyclotetrasiloxane. Other known cyclic siloxanes are listed in "Chemistry and Technology of Silicones" by Walter Noll, Academic Press, New York (1968), Tables 41, 44 and 45.

The cyclic siloxanes can also be polymerized in the presence of relatively low molecular weight linear siloxanes such as hexamethyldisiloxane, chloropentamethyldisiloxane and octamethyltrisiloxane which serve to terminate the growing chain and provide stable fluids or fluids having reactive end groups.

There is a host of commercially available cationically-sensitive monomers which can be used in this invention. In particular, cyclic ethers which are readily available include propylene oxide, oxetane, epichlorohydrin, tetrahydrofuran, styrene oxide, vinylcyclohexene oxide, glycidol, glycidyl methacrylate, octylene oxide, phenyl glycidyl ether, 1,2-butane oxide, diglycidyl ether of bisphenol A (e.g., "Epon 828" and "DER 331"), vinylcyclohexene dioxide (e.g., "ERL-4206), 3,4-epoxycyclohexylmethyl-3,4-epoxycyclohexanecarboxylate (e.g., "ERL-4221"), 3,4-epoxy-6-methylcyclohexylmethyl 3,4-epoxy-6-methylcyclohexanecarboxylate (e.g., "ERL-4201"), bis(3,4-epoxy-6-methylcyclohexylmethyl)adipate (e.g., "ERL-4289"), aliphatic epoxy modified with polypropylene glycol (e.g., "ERL-4050" and "ERL-4052"), dipentene dioxide (e.g., "ERL-4269"), epoxidized polybutadiene (e.g., "Oxiron 2001"), silicone epoxy (e.g., "Syl-Kem 90"), 1,4-butanediol diglycidyl ether (e.g., Araldite RD-2), polyglycidyl ether of phenolformaldehyde novolak (e.g., "DER-431", "Epi-Rez 521" and "DER-438"), resorcinol diglycidyl ether (e.g., "Kopoxite"), polyglycol diepoxide (e.g., "DER 736"), polyacrylate epoxide (e.g., "Epocryl U-14"), urethane modified epoxide (e.g., "QX3599"), polyfuncational flexible epoxides (e.g., "Flexibilizer 151"), and mixtures thereof as well as mixtures thereof with co-curatives, curing agents, or hardeners which also are well known (see Lee and Neville and Bruins, supra). Representative of the co-curatives of hardeners which can be used are acid anhydrides such as nadic methyl anhydride, cyclopentanetetracarboxylic dianhydride, pyromellitic anhydride, cis-1,2-cyclohexanedicarboxylic anhydride, and mixtures thereof.

In general, the polymerization of cationically-sensitive monomers with the ionic salt of an organometallic complex can be carried out at room temperature for the majority of cationically-sensitive monomers, although low temperature (e.g., $-10°$ C.) or elevated temperatures (e.g., 30° to 200° C., preferably 50° to 150° C.), can be used to either subdue the exotherm of polymerization or to accelerate the polymerization. In the case of latent salt catalysts of this invention, temperatures generally in the range of 50° to 250° C., preferably from 50° to 150° C., can be used. The temperature of polymerization and amount of catalyst will vary and be dependent on the particular cationically-sensitive monomer used and the desired application of the polymerized or cured product. The amount of ionic salt of an organometallic complex to be used as a catalyst in this invention should be sufficient to effect polymerization of the cationically-sensitive monomer (i.e., a catalytically effective amount) under the desired use conditions. Such amount generally will be in the range of about 0.001 to 20 weight percent, preferably 0.5 to 5.0 weight percent, and most preferably 1.0 to 2.0 weight percent, based on the weight of cationically-sensitive monomer.

Solvents can be used to assist in dissolution of the ionic salt in the cationically-sensitive material and are preferred for use in the polymerizable compositions. Representative solvents include acetone, methyl ethyl ketone, cyclopentanone, methyl cellosolve acetate, methylene chloride, nitromethane, methylformate, acetonitrile, and 1,2-dimethoxyethane (glyme).

The curable or polymerizable compositions of this invention comprising the cationically-sensitive monomer(s) and the ionic salt of an organometallic complex as catalyst can be used for applications such as those in which other cationically-sensitive compositions employing Lewis acid catalysts such as $BF_3$ or $BF_3$.diethyl ether or the radiation sensitive onium salts are used. Thus, the compositions can be used as adhesives, caulking and sealing compounds, casting and molding compounds, potting and encapsulating compounds, impregnating and coating compounds, etc. depending on the particular cationically-sensitive monomer and ionic organometallic complex used. In addition, the composition may contain adjuvants (e.g., fillers, such as silica, talc, glass bubbles, clay, reinforcing fibers, dyes, pigments, plasticizers, slip agents, antioxidants, surface modifying agents, etc.,) as long as they do not interfere with the polymerization of the cationically-sensitive components of the composition or, where the ionic salt of the organometallic complex is radiation-sensitive, absorb radiation to which the complex is responsive.

For those compositions of the invention which are radiation-sensitive, i.e., the compositions containing cationically-sensitive monomers and an ionic salt of an organometallic complex of Formulas I, II, and III, any source of radiation emitting active radiation in the ultraviolet and visible region of the spectrum (e.g., about 200 to 600 nm) can be used. Suitable sources of radiation include mercury vapor discharge lamps, carbon arcs, tungsten lamps, xenon lamps, sunlight, etc. The required amount of exposure to effect polymerization is dependent upon such factors as the identity and concentration of the organometallic ionic complex, the particular cationically-sensitive monomer, the thickness of the exposed material, type of substrate, intensity of the radiation source and amount of heat associated with the radiation. Optionally, it is within the scope of this invention to include spectral sensitizers in the radiation-sensitive composition. Any photosensitizer may be useful if its triplet energy is at least 45 kcal/mole. Examples of such sensitizers are given in Table 21 of the reference, Steven L. Murov, *Handbook of Photochemistry*, Marcel Dekker Inc., New York, 27-35 (1973), and include pyrene, fluoroanthrene, benzil, chrysene, p-terphenyl, acenaphthene, naphthalene, phenanthrene, and biphenyl. When present, the amount of sensitizer used in the practice of the present invention is generally in the range of 0.01 to 10 parts, and preferably 0.1 to 1.0 parts, by weight of sensitizer per part of organometallic salt.

The objects and advantages of this invention are further illustrated by the following examples, many of which utilize as cationically-sensitive monomer a stock solution consisting of 1 part by weight of vinylcyclohexene dioxide and 1 part by weight of 3,4-epoxycyclohexylmethyl-3,4-epoxycyclohexanecarboxylate. The particular materials and amounts thereof recited in these examples, which are in parts by weight, as well as other conditions and details should not be construed to unduly limit this invention.

EXAMPLES 1-4

Polymerizable solutions were prepared by mixing in four suitable vessels 10 parts of stock solution, 1.0 part of acetonitrile, and 0.1 part in each vessel respectively, of (Example 1) the hexafluoroantimonate, (Example 2) the hexafluoroarsenate, (Example 3) the hexafluorophosphate, and (Example 4) the tetrafluoroborate salt of ($\eta^6$-mesitylene)($\eta^5$-cyclopentadienyl)iron(1+) (each prepared as described in W. A. Hendrickson, Ph.D. thesis, U. of Florida (1978)). The solutions were coated onto polyvinylidene chloride primed 75 micrometer polyester using a number 22 wire wound coating rod and the coatings allowed to air dry for 30 minutes. The coated samples were then exposed to a 150 watt tungsten spotlight at a distance of 10 cm from the sample surface. The time required to produce a non-tacky surface for each sample is given in Table I.

TABLE I

| Ex. No. | Counterion of ($\eta^6$-mesitylene)($\eta^5$-cyclopentadienyl)-iron (1+) | Time to produce non-tacky surface |
|---|---|---|
| 1 | $SbF_6^-$ | 30 sec |
| 2 | $AsF_6^-$ | 45 sec |
| 3 | $PF_6^-$ | 120 sec |
| 4 | $BF_4^-$ | greater than 30 min[a] |

[a]becomes non-tacky after heating at 100° C. for 60 min

EXAMPLES 5-7

Coatings were prepared as described in Examples 1-4 using as catalyst the hexafluorophosphate salts of, respectively, (Example 5) ($\eta^6$-naphthalene)($\eta^5$-cyclopentadienyl)iron(1+), (Example 6) ($\eta^6$-chrysene)($\eta^5$-cyclopentadienyl)iron(1+), and (Example 7) ($\eta^6$-pyrene)($\eta^5$-cyclopentadienyl)iron(1+). (These salts were prepared according to the procedure described in *J. Organometal. Chem.* 101, 221 (1975)). Samples of each coating (labeled (b)) were exposed to the output of the 150 watt tungsten lamp as described in Examples 1-4 and other samples of the coatings (labeled (c)) were exposed to the output of the 150 watt tungsten lamp that passed through a light filter that removed 99% of the radiation below 440 nm. The time to produce a non-tacky coating for each sample is recorded in Table II.

TABLE II

| | | Time to produce non-tacky surface | |
|---|---|---|---|
| Ex. No. | Catalyst hexafluorophosphate salt of: | (b) no filter | (c) 440 nm filter |
| 5 | ($\eta^6$-naphthalene)($\eta^5$-cyclopentadienyl)iron(1+) | 30 sec | 60 sec |
| 6 | ($\eta^6$-chrysene)($\eta^5$-cyclopentadienyl)iron(1+) | 30 sec | 60 sec |
| 7 | ($\eta^6$-pyrene)($\eta^5$-cyclopentadienyl)iron(1+) | 15 sec | 30 sec |

EXAMPLES 8 and 9

The procedure of Example 5-7 was repeated using as catalyst the hexafluorophosphate salt and the hexafluoroantimonate salt of ($\eta^6$-fluorene)($\eta^5$-cyclopentadienyl)iron(1+). The time required to produce a non-tacky surface with the hexafluorophosphate salt was 60 seconds for exposures without the filter and 120 seconds with the filter. With the hexafluoroantimonate salt, exposures to produce a non-tacky surface were 30 and 60 seconds respectively.

The ($\eta^6$-fluorene)($\eta^5$-cyclopentadienyl)iron(1+) salts were prepared as described in Hendrickson, Ph.D. thesis, Univ. of Florida (1978).

EXAMPLES 10-15

Coating solutions were prepared by mixing 10 parts of stock solution, 2 parts of acetone and 0.1 part of each of the various organometallic complex salts shown in Table III. Each solution was coated and dried as described in Examples 1-4 and exposed as described in Examples 5-7. The time required to produce a non-tacky surface for each is given in Table III.

TABLE III

| | | Time to produce non-tacky surface sec. | |
|---|---|---|---|
| Ex. No. | Catalyst[(d),(e)] | no filter | 440 nm filter |
| 10 | [($\eta^6$-1,2,3,4,4a,9a)-9-(4-methylphenylmethylidene)fluorene]-($\eta^5$-cyclopentadienyl)iron(1+) | 30 | 90 |
| 11 | [($\eta^6$-1,2,3,4,4a,9a)-9-(4-methoxyphenylmethylidene)fluorene]-($\eta^5$-cyclopentadienyl)iron(1+) | 15 | 60 |
| 12 | [($\eta^6$-1,2,3,4,4a,9a)-9-(2,4-dimethoxyphenylmethylidene)fluorene]-($\eta^5$-cyclopentadienyl)iron(1+) | 30 | 60 |
| 13 | [($\eta^6$-1,2,3,4,4a,9a)-9-(3,4-dimethoxyphenylmethylidene)fluorene]-($\eta^5$-cyclopentadienyl)iron(1+)[(*)] | 15 | 90 |
| 14 | [($\eta^6$-1,2,3,4,4a,9a)-9-(3-phenyl-2-propenylidene)fluorene]-($\eta^5$-cyclopentadienyl)iron(1+) | 60 | 90 |
| 15 | [($\eta^6$-1,2,3,4,4a,9a)-9-(4-N,N-dimethylaminophenylmethylidene)fluorene]-($\eta^5$-cyclopentadienyl) | 45 | 120 |

TABLE III-continued

| Ex. No. | Catalyst[d],[e] | Time to produce non-tacky surface sec. | |
|---|---|---|---|
| | | no filter | 440 nm filter |
| | iron(1−) | | |

[d] All counterions are hexafluorophosphate
[e] Prepared by first condensing the corresponding aldehyde (i.e., 4-methylbenzaldehyde, 4-methoxybenzaldehyde, 2,4-dimethoxybenzaldehyde, 3,4-dimethoxybenzaldehyde, cinnamaldehyde, and 4-N,N-dimethylaminobenzaldehyde) with ($\eta^6$-fluorene)($\eta^5$-cyclopentadienyl)iron(1−) hexafluorophosphate (prepared in Example 8) using a catalytic amount of potassium hydroxide in aqueous ethanol under nitrogen

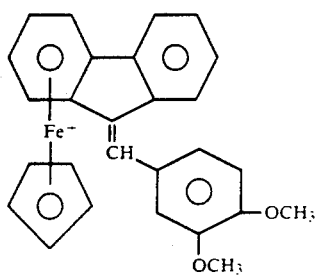

EXAMPLE 16

A coating solution, prepared by mixing 10 parts of stock solution, 1 part of acetonitrile and 0.1 part of ($\eta^6$-toluene)($\eta^5$-cyclopentadienyl)iron(1+) hexafluorophosphate, (prepared as described in the previously cited Ph.D. Thesis of W. A. Hendrickson), was coated and dried as described in Examples 1–4. On exposure of the dried coating to a 150 watt tungsten spotlight at 10 cm, a non-tacky surface was obtained in 60 seconds. Only 30 seconds were required to produce a non-tacky surface when the coating was exposed to the output of a 275 watt G.E. sunlamp at 10 cm.

EXAMPLES 17 AND 18

Example 16 was repeated using poly($\eta^6$-styrene)-($\eta^5$-cyclopentadienyl)iron(1+) hexafluorophosphate or poly($\eta^6$-styrene)tricarbonylmanganese(1+) hexafluoroarsenate in place of ($\eta^6$-toluene)($\eta^5$-cyclopentadienyl)iron(1+) hexafluorophosphate. Exposure times were 120 seconds and 45 seconds to produce a non-tacky coating using the 150 watt tungsten spotlight and the 275 watt sunlamp respectively.

The polystyrene iron complex was prepared as described in the before-mentioned Ph.D. thesis and the polystyrene manganese complex was prepared as described in J. Chem. Soc. (Chem. Comm.) 688 (1975) using polystyrene having a number average molecular weight of 22,000 in place of mesitylene or toluene, respectively. The iron complex obtained had approximately one ($\eta^5$-cyclopentadienyl)iron-(1+) unit per eight styrene units and the manganese complex obtained had approximately one tricarbonylmanganese(1+) unit per three styrene units.

EXAMPLES 19-51

Polymerizable solutions were prepared as described in previous examples using the polymerizable compositions and the organometallic salts listed in Table IV. Each solution was coated onto primed polyester film and the coating dried as previously described, and exposed to polymerizing conditions as shown in Table IV.

The time required to obtain a tack-free coating for each is given in Table IV.

TABLE IV

| Ex. No. | Ionic organometallic complex salt[f] | Time of sunlamp[g] | Oven at 75° C. |
|---|---|---|---|
| 19 | [h][$\eta^6$-1,2,3,4,4a,9a)($\eta^6$-5,6,7,8,8a,5a)fluorene]bis($\eta^5$-cyclopentadienyl)diiron(2+) hexafluorophosphate | 15 sec | |
| 20 | [i]bis($\eta^6$-mesitylene)iron(2+) hexafluorophosphate | greater than 30 min | |
| 21 | [i]bis($\eta^6$-mesitylene)iron(2+) hexafluorophosphate | greater than 30 min | |
| 22 | [j]bis($\eta^6$-mesitylene)iron(2+) hexafluoroantimonate | 5 sec | 10 min |
| 23 | [k]bis($\eta^6$-hexamethylbenzene)cobalt(2+) hexafluoroantimonate/hydroxypentafluoroantimonate | 10 sec | 10 min |
| 24 | [k]bis($\eta^6$-benzene)chromium(1+) hexafluoroantimonate | 20 sec | |
| 25 | [m]($\eta^3$-allyl)($\eta^5$-methycyclopentadienyldicarbonylmanganese(1+) hexafluoroarsenate | 15 min | |
| 26 | [m]($\eta^3$-allyl)($\eta^5$-methylcyclopentadienyldicarbonylmanganese(1+) hexafluorophosphate | 30 min | |
| 27 | [n]($\eta^5$-cyclohexadienyl)tricarbonyliron(1+) hexafluoroarsenate | 120 sec | 30 min |
| 28 | [o]($\eta^7$-cycloheptatrienyl)tricarbonylchromium(1+) hexafluorophosphate | 15 min | |
| 29 | [o]($\eta^7$-cycloheptatrienyl)tricarbonylchromium(1−) hexafluoroarsenate | 30 sec | |
| 30 | [o]($\eta^7$-cycloheptatrienyl)tricarbonylchromium(1+) hexafluoroantimonate | 15 sec | |
| 31 | [o]($\eta^7$-cycloheptatrienyl)tricarbonylmolybdenum(1−) hexafluoroarsenate | 30 sec | |
| 32 | [o]($\eta^7$-cycloheptatrienyl)tricarbonyltungsten(1−) hexafluoroarsenate | 15 min | |
| 33 | [p]($\eta^6$-toluene)tricarbonylmanganese(1−) hexafluorophosphate | 10 sec | |
| 34 | [p]($\eta^6$-toluene)tricarbonylmanganese(1+) hexafluoroarsenate | 15 sec | |
| 35 | [q]($\eta^6$-mesitylene)tricarbonylrhenium(1+) hexafluoroarsenate | 15 sec | |
| 36 | [r]($\eta^5$-cyclopentadienyl)dicarbonyltriphenylphosphineiron(1−) hexafluorophosphate | 240 sec | |
| 37 | [r]($\eta^5$-cyclopentadienyl)dicarbonyltriphenylphosphineiron(1+) hexafluoroarsenate | 45 sec | |
| 38 | [r]($\eta^5$-cyclopentadienyl)dicarbonyltriphenylphosphineiron(1+) hexafluoroantimonate | 45 sec | |
| 39 | [r]($\eta^5$-cyclopentadienyl)dicarbonyltriphenylarsineiron(1+) hexafluoroarsenate | 10 sec | |
| 40 | [r]($\eta^5$-cyclopentadienyl)dicarbonyltriphenylstibineiron(1+) hexafluoroantimonate | 5 sec | |
| 41 | [r]($\eta^5$-cyclopentadienyl)dicarbonyltriphenylstibineiron(1+) hexafluoroarsenate | 10 sec | |
| 42 | [r]($\eta^5$-cyclopentadienyl)dicarbonyltriphenylstibineiron(1−) hexafluorophosphate | 45 sec | |
| 43 | [r]($\eta^5$-cyclopentadienyl)dicarbonyltriphenylstibineiron(1−) tetrafluoroborate | greater than 60 min | |
| 44 | [s]hexacarbonylrhenium(1−) hexafluoroantimonate/hydroxypentafluoroantimonate | 20 sec | |
| 45 | [s]($\eta^5$-cyclopentadienyl)tricarbonyliron(1−) hexafluoroantimonate | 10 sec | 30 min |

TABLE IV-continued

| Ex. No. | Ionic organometallic complex salt(f) | Time of sunlamp(g) | Oven at 75° C. |
|---|---|---|---|
| 46 | (t)(η⁵-methylcyclopentadienyl)di-carbonylnitrosylmanganese(1−) hexafluorophosphate | 30 sec | 30 min |
| 47 | (t)(η⁵-methylcyclopentadienyl)di-carbonylnitrosylmanganese(1−) hexafluoroantimonate | 15 sec | 10 min |
| 48 | (u)(η⁶-aniline)(η⁵-cyclopenta-dienyl)iron(1−) hexafluoro-arsenate | 15 sec | |
| 49 | (u)(η⁶-benzene)(η⁵-cyclo-pentadienyl)iron(1−) hexafluoro-arsenate | 15 sec | |
| 50 | (u)(η⁶-carbazole)(η⁵-cyclo-pentadienyl)iron(1−) hexafluoro-phosphate | 15 sec | |
| 51 | (v)[tris(η⁶-benzenecobalt)dicar-bonyl]-(1−) hexafluoro-antimonate | 120 sec | |

(f)Coatings were made as described in previous examples using by weight 0.1 part of the ionic complex in a mixture of 5 parts of vinyl cyclohexene dioxide, 5 parts of 3,4-epoxycyclohexylmethyl-3,4-epoxycyclohexanecarboxylate, and 1 part of acetonitrile with the exception of Examples 19-21 in which 2 parts of acetonitrile were used and Examples 22 and 51 in which 2 parts of nitromethane were used
(g)Exposures were made using a 275 watt G. E. sunlamp at a distance of 10 cm from the coating Prepared in accordance with the procedure outlined in
(h) J. Organometallic Chem. 186, 265 (1980).
(i) J. Chem. Soc. (Chem. Comm.) 930 (1971).
(j) J. Organometallic Chem. 1, 307 (1964).
(k) Inorganic Synth. 6, 132 (1960).
(l) J. Organometallic Chem. 12, p 18 (1968)
(m) J. Chem. Soc. (Chem. Comm.) 311 (1981).
(n) Angew. Chemie 72, 919 (1960).
(o) Inorg. Chem. 5, 1837 (1966)
(p) J. Chem. Soc., 0, 1677 (1975).
(q) Inorg. Chem. 1, 933 (1962).
(r) J. Inorg. Nucl. Chem. 1, 165 (1955) and Inorg. Chem. 5, 1177 (1966).
(s) J. Am. Chem. Soc. 99, 4726 (1977).
(t) Organometallic Synthesis, A. R. B. King, Academic Press, New York 1965.
(u) W. A. Hendrickson, Ph.D. thesis, U. of Florida (1978).
(v) Gazz. Chim. Ital. 88, 1170 (1958).

EXAMPLES 52-63

To illustrate the range of concentrations of ionic salts of organometallic complexes effective for catalyzing the polymerization of cationically polymerizable compounds, solutions were prepared as described previously consisting of stock solution, solvent, and 10.0 to 0.01 percent by weight, based on total weight of stock solution, of ionic salt as shown in Table V. Each mixture was coated onto poly(vinylidene chloride) primed polyester sheeting, dried, and exposed to the radiation of a 275 watt G. E. sunlamp at a distance of 10 cm until the coating was non-tacky to the touch. The results are given in Table V.

TABLE V

| Ex. no | Ionic organometallic complex salt | Conc. of salt | Time of cure |
|---|---|---|---|
| 52 | bis(η⁶-mesitylene)iron(2−) hexafluoroantimonate | 10.0 | 5 sec |
| 53 | bis(η⁶-mesitylene)iron(2−) hexafluoroantimonate | 1.0 | 5 sec |
| 54 | bis(η⁶-mesitylene)iron(2−) hexafluoroantimonate | 0.1 | 10 sec |
| 55 | bis(η⁶-mesitylene)iron(2−) hexafluoroantimonate | 0.01 | greater than 30 min |
| 56 | (η⁵-cyclopentadienyl)dicarbonyl-triphenylstibineiron(1+) hexafluoroantimonate | 10.0 | 5 sec |
| 57 | (η⁵-cyclopentadienyl)dicarbonyl-triphenylstibineiron(1+) hexafluoroantimonate | 1.0 | 5 sec |
| 58 | (η⁵-cyclopentadienyl)dicarbonyl-triphenylstibineiron(1+) hexafluoroantimonate | 0.1 | 45 sec |
| 59 | (η⁵-cyclopentadienyl)dicarbonyl-triphenylstibineiron(1+) hexafluoroantimonate | 0.01 | greater than 30 min |
| 60 | (η⁶-mesitylene)(η⁵-cyclopentadienyl)iron(1+) hexafluoroantimonate | 10.0 | 5 sec |
| 61 | (η⁶-mesitylene)(η⁵-cyclopentadienyl)iron(1−) hexafluoroantimonate | 1.0 | 5 sec |
| 62 | (η⁶-mesitylene) (η⁵-cyclopentadienyl)iron(1+) hexafluoroantimonate | 0.1 | 30 sec |
| 63 | (η⁶-mesitylene)(η⁵-cyclopentadienyl)iron(1+) hexafluoroantimonate | 0.01 | greater than 30 min |

Various modifications and alterations of this invention will become apparent to those skilled in the art without departing from the scope and spirit of this invention, and it should be understood that this invention is not to be unduly limited to the illustrative embodiment set forth herein.

We claim:

1. An energy polymerizable composition comprising a cationically polymerizable material selected from the group consisting of cyclic ethers, vinyl ethers, N-vinyl compounds, cyclic formals, and cyclic organosiloxanes, and a catalytically effective amount of an ionic salt of an organometallic complex cation and a halogen containing complex anion of a metal or metalloid, said ionic salt being capable of adding an intermediate strength nucleophile or upon photolysis capable of liberating at least one coordination site, the metal in said organometallic complex cation being selected from elements of Periodic Groups IV, VI, VIB, VIIB, and VIIIB, the total charge on said metal in said cation resulting in a net residual positive charge to said complex.

2. The composition according to claim 1 wherein said ionic salt has the formula:

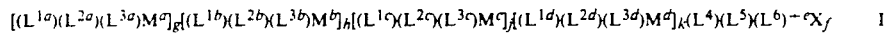

$$[(L^{1a})(L^{2a})(L^{3a})M^a]_g[(L^{1b})(L^{2b})(L^{3b})M^b]_h[(L^{1c})(L^{2c})(L^{3c})M^c]_i[(L^{1d})(L^{2d})(L^{3d})M^d]_k(L^4)(L^5)(L^6)^{+e}X_f \quad I$$

wherein $M^a$, $M^b$, $M^c$, and $M^d$ each represents a metal selected from the elements of Periodic Groups IVB, VB, VIB, VIIB, and VIIIB;

with the proviso that Formula I can represent a mononuclear, binuclear, trinuclear, or tetranuclear complex compound comprising $M^a$, $M^aM^b$, $M^aM^bM^c$, or $M^aM^bM^cM^d$ respectively with their attendent ligands. L;

$L^{1a}$, $L^{1b}$, $L^{1c}$, and $L^{1d}$ each represents none, 1, 2, or 3 ligands contributing π-electrons that can be the same or different ligands selected from substituted and unsubstituted acyclic and cyclic unsaturated compounds and groups and substituted and unsubstituted carbocyclic aromatic and heterocyclic aromatic compounds, each capable of contributing two to twelve π-electrons to the valence shell of $M^a$, $M^b$, $M^c$, and $M^d$ respectively;

$L^{2a}$, $L^{2b}$, $L^{2c}$ and $L^{2d}$ each represents none or 1 to 6 ligands contributing an even number of σ-electrons that can be the same or different selected from mono-, di-, and tri-dentate ligands, each contributing 2, 4, or 6 σ-electrons to the valence shell of $M^a$, $M^b$, $M^c$, and $M^d$ respectively;

$L^{3b}$, $L^{3c}$, and $L^{3d}$ each represents none, 1 or 2 ligands contributing one σ-electron each to the valence shell of $M^a$, $M^b$, $M^c$, and $M^d$ respectively;

$L^4$ represents none or 1 to 6 bridging ligands containing π-electrons that can be the same or different ligand selected from substituted and unsubstituted acyclic and cyclic unsaturated compounds and groups and substituted and unsubstituted carbocyclic aromatic and heterocyclic aromatic compounds, each capable of acting as a bridging ligand contributing 2 to 24 π-electrons to the valence shells of two or more metal atoms $M^a$, $M^b$, $M^c$, or $M^d$ simultaneously;

$L^5$ represents none or 1 to 12 bridging ligands contributing an even number of σ-electrons that can be the same or different selected from mono, di, and tri-dentate ligands, each donating 2, 4, or 6 σ-electrons to the valence shells of two or more metal atoms $M^a$, $M^b$, $M^c$, or $M^d$ simultaneously;

$L^6$ represents none or 1 to 12 bridging ligands contributing 1, 2, 3, or 4 σ-electrons to the valence shells of two or more metal atoms $M^a$, $M^b$, $M^c$, or $M^d$ simultaneously;

with the proviso that the total electronic charge contributed to $M^a$, $M^b$, $M^c$, and $M^d$ by the ligands $L^{1a}$, $L^{2a}$, $L^{3a}$, $L^{1b}$, $L^{2b}$, $^{3b}$, $L^{1c}$, $L^{2c}$, $L^{3c}$, $L^{1d}$, $L^{2d}$, $L^{3d}$, $L^4$, $L^5$, and $L^6$ plus the sum of ionic charge on $M^a$, $M^b$, $M^c$, and $M^d$ results in a residual net positive charge of e to the complex;

e is an integer having a value of 1, 2, or 3, the residual electrical charge of the complex cation;

X is a halogen containing complex anion of a metal or metalloid;

f is an integer of 1 to 3, the number of complex anions required to neutralize the charge e on the complex cation, and g, h, j, and k independently are 0 or 1, with at least one of them being equal to 1.

3. The composition according to claim 2 wherein the ligands $L^{1a}$, $L^{1b}$, $L^{1c}$, and $L^{1d}$ of the ionic salt each contains less than 100 carbon atoms and up to 10 hetero atoms selected from nitrogen, sulfur, oxygen, phosphorus, arsenic, selenium, antimony, tellurium, silicon, germanium, tin, and boron;

the ligands $L^{2a}$, $L^{2b}$, $L^{2c}$, and $L^{2d}$ of the ionic salt each is selected from:

a. monodentate ligands having up to 30 carbon atoms and up to 10 hetero atoms selected from nitrogen, sulfur, oxygen, phosphorus, arsenic, selenium, antimony, tellurium, and b. polydentate ligands capable of forming with metal $M^a$, $M^b$, $M^c$, or $M^d$ a 4-, 5-, or 6-membered saturated or unsaturated ring containing up to 10 hetero atoms selected from nitrogen, sulfur, oxygen, phosphorus, arsenic, selenium, antimony, tellurium, in addition to the metal atom;

the ligands $L^{3a}$, $L^{3b}$, $L^{3c}$, and $L^{3d}$ of the ionic salt each has up to 30 carbon atoms and up to 10 hetero atoms selected from nitrogen, sulfur, oxygen, phosphorus, arsenic, selenium, antimony, tellurium, silicon, germanium, tin, and boron;

the bridging ligand $L^4$ of the ionic salt contains less than 100 carbon atoms and up to 10 hetero atoms selected from nitrogen, sulfur, oxygen and nitrogen, sulfur, oxygen, phosphorus, arsenic, selenium, antimony, tellurium, silicon, germanium, tin, and boron;

the bridging ligand $L^5$ of the ionic salt contains up to 30 carbon atoms and up to 10 hetero atoms selected from nitrogen, sulfur, oxygen, phosphorus, arsenic, selenium, antimony, tellurium, and boron; and the bridging radical $L^6$ of the ionic salt has up to 30 carbon atoms and up to 10 hetero atoms selected from nitrogen, sulfur, oxygen, phosphorus, arsenic, selenium, antimony, tellurium, silicon, germanium, tin, and boron.

4. The composition according to claim 2 wherein the ligands $L^{1a}$, $L^{1b}$, $L^{1c}$, and $L^{1d}$ each is independently unsubstituted or substituted by a group selected from hydrocarbyl, hydrocarbyloxy, hydrocarbylmercapto, hydrocarbyloxycarbonyl, hydrocarbylcarbonyl, hydrocarbylcarbonamido, phenyl, azo, boryl, halo, hydroxy, cyano, nitro, nitroso, oxo, dimethylamino, diphenylphosphino, trimethylsiloxy, and condensed rings, said group containing up to 30 carbon atoms and up to 10 hetero atoms selected from nitrogen, sulfur, oxygen, nitrogen, sulfur, oxygen, phosphorus, arsenic, selenium, antimony, tellurium, silicon, germanium, tin, and boron.

5. The composition according to claim 2 wherein said $L^{1a}$, $L^{1b}$, $L^{1c}$, $L^{1d}$, $L^{2a}$, $L^{2b}$, $L^{2c}$, $L^{2d}$, $]^{3a}$, $L^{3b}$, $L^{3c}$, $L^{3d}$, $L^4$, $L^5$, and $L^6$ ligands independently are groups on a polymeric chain.

6. The composition according to claim 1 wherein said ionic salt has the formula:

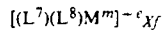

$$[(L^7)(L^8)M^m]^{+e}X_f \qquad \text{II}$$

wherein $M^m$ represents a metal selected from elements of the Periodic Groups IVB, VB, VIB, VIIB, and VIIIB;

$L^7$ represents none, one, or two π-electron contributing ligands that can be the same or different ligand selected from substituted and unsubstituted acyclic and alicyclic unsaturated compounds and groups and substituted and unsubstituted carbocyclic and heterocyclic aromatic compounds, each capable of contributing two to twelve π-electrons to the valence shell of $M^m$;

$L^8$ represents none or 1 to 6 ligands that can be the same or different ligand selected from mono-, di-, and tri-dentate ligands, each contributing 2, 4, or 6 σ-electrons to the valence shell of $M^m$;

with the proviso that the total electronic charge contributed to $M^m$ by $L^7$ and $L^8$ plus the ionic charge on $M^m$ results in a residual net positive charge of e to the complex;

e is an integer having a value of 1, 2, or 3, the residual electrical charge of the complex cation;

X is a halogen containing complex anion of a metal or metalloid; and f is an integer of 1 to 3, the number of complex anions required to neutralize the charge of e on the complex cation.

7. The composition according to claim 6 wherein ligand $L^7$ of the ionic salt contains less than 100 carbon atoms and up to 10 hetero atoms selected from nitrogen, sulfur, oxygen, phosphorus, arsenic, selenium, antimony, tellurium, silicon, germanium, tin, and boron;

ligand L$^8$ of the ionic salt is selected from:
  a. monodentate ligands having up to 30 carbon atoms and up to 2 hetero atoms selected from nitrogen, sulfur, oxygen, phosphorus, arsenic, selenium, antimony, tellurium, silicon, germanium, tin, and boron, and
  b. polydentate ligands capable of forming with metal M$^m$ a 4-, 5-, or 6-membered saturated or unsaturated ring containing up to 10 hetero atoms selected from nitrogen, sulfur, oxygen, phosphorus, arsenic, selenium, antimony, tellurium, silicon, germanium, tin, and boron in addition to the metal atom.

8. The composition according to claim 7 wherein ligand L$^7$ is substituted by a group selected from hydrocarbyl, hydrocarbyloxy, hydrocarbylmercapto, hydrocarbyloxycarbonyl, hydrocarbylcarbonyl, hydrocarbylcarbonamido, phenyl, azo, boryl, halo, hydroxy, cyano, nitro, nitroso, oxo, dimethylamino, diphenylphosphino, trimethylsiloxy, and condensed rings, said group containing up to 30 carbon atoms and up to 10 hetero atoms selected from nitrogen, sulfur, oxygen, phosphorus, arsenic, selenium, antimony, tellurium, silicon, germanium, tin, and boron.

9. The composition according to claim 1 wherein said ionic salt has the formula:

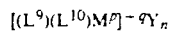

wherein
  M$^p$ represents a metal selected from Cr, Mo, W, Mn, Re, Fe, and Co;
  L$^9$ represents one or two $\pi$-electron contributing ligands that can be the same or different ligand selected from substituted and unsubstituted $\eta^3$-allyl, $\eta^5$-cyclopentadienyl, and $\eta^7$-cycloheptatrienyl and $\eta^6$-aromatic compounds selected from $\eta^6$-benzene and substituted $\eta^6$-benzene compounds and compounds having 2 to 4 fused rings each capable of contributing 3 to 12 $\pi$-electrons to the valence shell of M$^p$;
  L$^{10}$ represents none, 1 to 3 ligands contributing two $\sigma$-electrons to the valence shell of M$^p$;
with the proviso that the total electronic charge contributed to M$^p$ by ligands L$^9$ and L$^{10}$, plus the ionic charge on M$^p$ results in a residual net positive charge of q to the complex;
  q is an integer having a value of 1 or 2, the residual electrical charge of the complex cation;
  Y is a halogen containing complex anion selected from AsF$_6$—, SbF$_6$—, and SbF$_{50}$H—, and
  n is an integer of 1 or 2, the number of complex anions required to neutralize the charge q on the complex cation 10. The composition according to claim 9 wherein L$^9$ is substituted by a group selected from hydrocarbyl, hydrocarbyloxy, hydrocarbylmercapto, hydrocarbyloxycarbonyl, hydrocarbylcarbonyl, hydrocarbylcarbonamido, phenyl, azo, boryl, halo, hydroxy, cyano, nitro, nitroso, oxo, dimethylamino, diphenylphosphino, trimethylsiloxy, and condensed rings, said group containing up to 30 carbon atoms and up to 10 hetero atoms selected from nitrogen, sulfur, oxygen, phosphorus, arsenic, selenium, antimony, tellurium, silicon, germanium, tin, and boron.

11. The composition according to claim 9 wherein ligand L$^9$ of the ionic salt contains up to 24 carbon and up to two heteroatoms selected from nitrogen, oxygen, and sulfur.

12. The composition according to claim 9 wherein ligand L$^{10}$ of the ionic salt is selected from carbon monoxide and the nitrosonium ion.

13. The composition according to claim 1 wherein said salt is present in an amount in the range of 0.01 to 20 weight percent of said cationically polymerizable material.

14. The composition according to claim 1 wherein said salt is present in an amount in the range of 0.5 to 5.0 weight percent of said cationically polymerizable material.

15. The composition according to claim 1 wherein said salt is present in an amount in the range of 1.0 to 2.0 weight percent of said cationically polymerizable material.

16. The composition according to claim 1 further comprising in the range of 0.1 to 10 parts by weight of a spectral sensitizer per part of organometallic salt.

17. The composition according to claim 1 wherein said cyclic ether is an epoxy group-containing material.

18. The composition according to claim 17 which is a 1,2-, 1,3-, or 1,4- cyclic ether.

19. The composition according to claim 1 wherein said cyclic ether is a 1,2-cyclic ether.

20. A process of polymerizing cationically polymerizable materials comprising the steps:
  a. admixing a cationically polymerizable material selected from the group consisting of cyclic ethers, vinyl ethers, N-vinyl compounds, cyclic formals, cyclic organosiloxanes, with a cationically effective amount of an ionic salt of an organometallic complex, said ionic salt of an organometallic complex cation being capable of adding an intermediate strength nucleophile or upon photolysis capable of liberting at least one coordination site, said metal in said organometallic complex being selected from elements of Periodic Groups IVB, VB, VIB, VIIB, VIIIB, and .
  b. curing the resulting admixture with at least one of a thermal and actinic radiation source.

21. The process according to claim 20 wherein said curing step is accomplished by subjecting said composition to actinic radiation followed by heat.

* * * * *